(12) United States Patent
Carini et al.

(10) Patent No.: US 9,867,006 B1
(45) Date of Patent: Jan. 9, 2018

(54) GEO-CLASSIFICATION OF USERS FROM APPLICATION LOG DATA

(71) Applicant: Microsoft Technology Licensing, LLC, Redmond, WA (US)

(72) Inventors: Gaia Carini, Seattle, WA (US); John David Rodriguez, Woodinville, WA (US)

(73) Assignee: MICROSOFT TECHNOLOGY LICENSING, INC., Redmond, WA (US)

( * ) Notice: Subject to any disclaimer, the term of this patent is extended or adjusted under 35 U.S.C. 154(b) by 0 days.

(21) Appl. No.: 15/295,260

(22) Filed: Oct. 17, 2016

(51) Int. Cl.
H04W 4/02 (2009.01)
H04L 29/08 (2006.01)
H04L 12/26 (2006.01)
H04L 29/12 (2006.01)

(52) U.S. Cl.
CPC ............. *H04W 4/023* (2013.01); *H04L 43/16* (2013.01); *H04L 67/22* (2013.01); *H04L 61/6068* (2013.01)

(58) Field of Classification Search
CPC .. G06F 21/50; G06F 21/88; G06F 2221/2101; G06F 2221/2111; H04W 4/021; H04W 4/043
See application file for complete search history.

(56) References Cited

U.S. PATENT DOCUMENTS

| | | | |
|---|---|---|---|
| 6,424,840 B1 | 7/2002 | Fitch et al. | |
| 6,859,791 B1 | 2/2005 | Spagna et al. | |
| 7,636,785 B2 | 12/2009 | Shahine et al. | |
| 8,489,697 B2 | 7/2013 | Shin | |
| 8,577,892 B2 | 11/2013 | Pairault et al. | |
| 8,751,661 B1 | 6/2014 | Young et al. | |
| 8,838,767 B2 | 9/2014 | Lakes et al. | |
| 9,197,994 B2 | 11/2015 | Bohorquez | |
| 9,300,539 B2 | 3/2016 | DeJana et al. | |
| 2006/0064486 A1* | 3/2006 | Baron | H04L 41/0886 709/224 |
| 2013/0185722 A1 | 7/2013 | Kruglick | |
| 2014/0149280 A1 | 5/2014 | Karkhanis et al. | |
| 2014/0258374 A1 | 9/2014 | Suryanarayanan et al. | |
| 2016/0110975 A1* | 4/2016 | Oppenheimer | G06F 21/50 340/572.1 |

FOREIGN PATENT DOCUMENTS

WO 02091204 A2 11/2002

* cited by examiner

*Primary Examiner* — Diane Mizrahi

(57) ABSTRACT

Non-limiting examples of the present disclosure describe evaluation of log data of an application/service for the migration of user data to a data center in a geographic region of a user. Log data for the application/service is evaluated over a given time period on a per user basis. Evaluation of the log data comprises determining, for a user, one or more active days within the given time period. An active day comprises one or more call operations made to the application by the user. A primary geographic region of the user may be determined for the given time period based on analysis of the one or more active days of the log data. One or more data centers may be assigned for storage of user data based on the primary geographic region.

20 Claims, 7 Drawing Sheets

500

600

GEO-CLASSIFICATION OF USERS FROM APPLICATION LOG DATA

BACKGROUND

Users of applications are spread all over the world. In today's landscape, a user can access an application/service remotely. While user data can be stored over a distributed network to enable remote access, location relating to where the user data is physically stored has become a hot topic. Among other issues, increasing regulation (e.g. international safe harbor privacy principles) will likely result in both users and companies taking a closer look at where data is being stored. As such, examples of the present application are directed to the general technical environment related to geo-classification of users where geo-classification information may be used for data management purposes, among other examples.

SUMMARY

Non-limiting examples of the present disclosure describe evaluation of log data of an application/service for the migration of user data to a data center in a geographic region of a user. Log data for the application/service is evaluated over a given time period on a per user basis. Evaluation of the log data comprises determining, for a user, one or more active days within the given time period. An active day comprises one or more call operations made to the application by the user. A primary geographic region of the user may be determined for the given time period based on analysis of the one or more active days of the log data. One or more data centers may be assigned for storage of user data based on the primary geographic region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
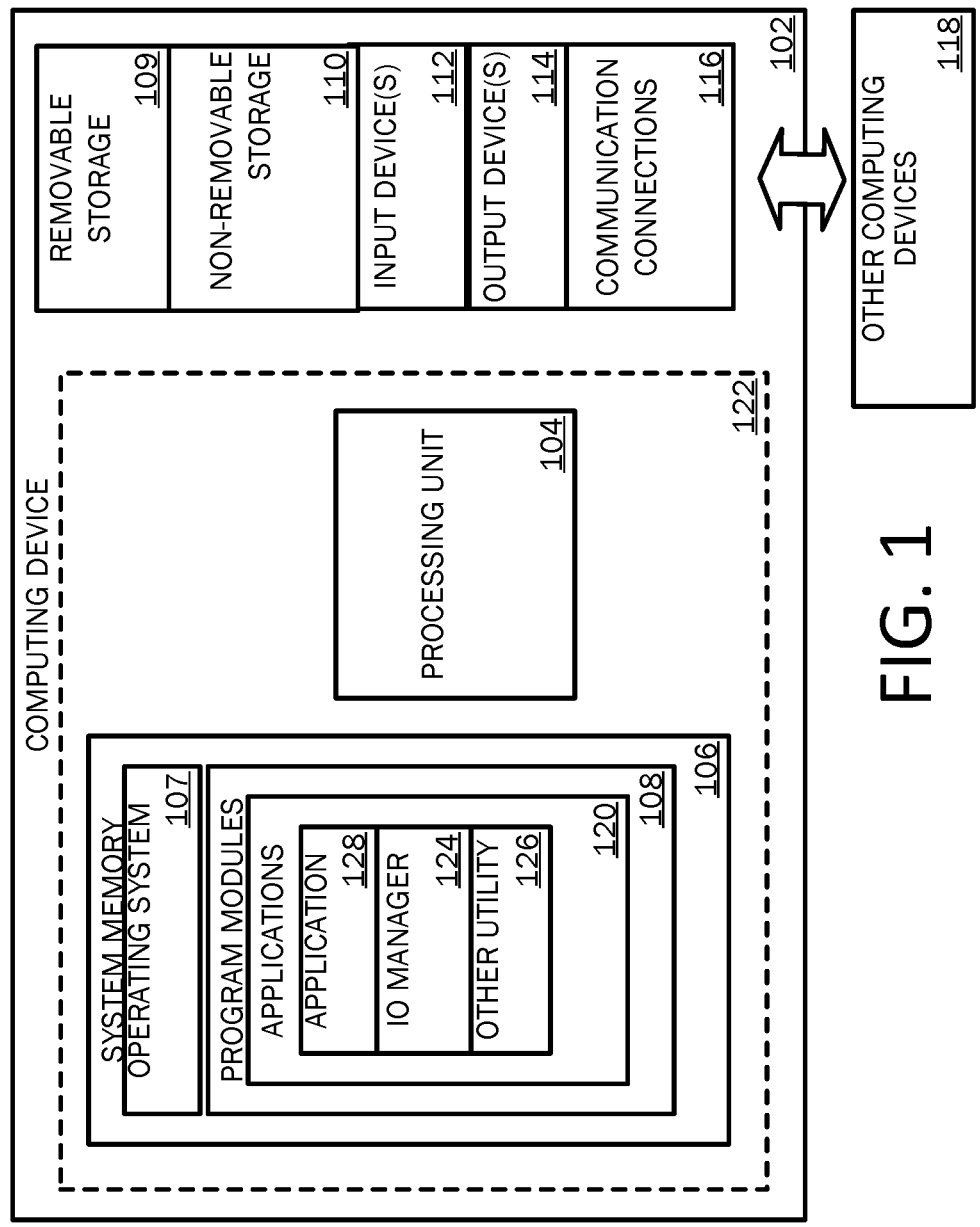
FIG. 1 is a block diagram illustrating an example of a computing device with which aspects of the present disclosure may be practiced.

As more and more users utilize application/services, more data is created. In some examples, data is stored within the United States even when users from other locations (e.g. Europe, Asia, etc.) are accessing such data. Data management may lead to the expansion of data centers in different locations of the world. As new data centers are opened, user data can be migrated closer to where the user is physically located. This improves network performance (e.g. where data being accessed is managed closer to where the user is actually located) by reducing latency when accessing user data, among other examples. Moreover, laws and regulations are constantly evolving where new requirements may be imposed for the management of user data. Migration of user data closer to where a user is located can assist with compliance of laws and regulations for user privacy as well as laws/regulations that will be enforced at a future point in time. Furthermore, migration of user data to data centers where a user may be located can also foster user confidence in an application/service by knowing that user data is stored locally.

Non-limiting examples of the present disclosure describe evaluation of log data of an application/service for the migration of user data to a data center in a geographic region of a user. Log data for the application/service is evaluated over a given time period on a per user basis. Evaluation of the log data comprises determining, for a user, one or more active days within the given time period. An active day comprises one or more call operations made to the application by the user. In one example, one or more internet protocol (IP) addresses may be identified that are associated with a largest amount of call volume for call operations of a particular active day of user log data. In such an example, a country associated with the one or more IP addresses may be identified, for example, using a mapping that comprises IP address ranges for associated countries. The identified country may be mapped to a particular geographic region. A particular geographic region pertains to a geographic region where the user is located on a particular day (e.g. active day of the given time period). Geographic region data may be aggregated over the given time period, where geographic region data may correspond to a particular geographic region for each of the active days. A primary geographic region of the user may be determined for the user based on analysis of the one or more active days of the log data. A primary geographic region is a location in the world that a user has spent the most time in for the given time period. A primary geographic region may be associated with one or more data centers across the world. In one example, the primary region is determined based on a threshold analysis of the aggregated geographic region data. A data center may be assigned for storage of user data based on the primary geographic region.

In one particular example, processing operation may be applied that evaluate historical logs for users accessing a storage application/service. IP addresses of log data may be evaluated to first determine the country where a user is located on a particular day. In examples, the country that a user is located in can be mapped to an exemplary particular geographic region. The particular geographic region where the user is located is looked at every day over a given time period (e.g. six-month period) to determine the primary geographic region of the user. Daily location of the user may be analyzed over the given time period rather than the raw call volume over six months in order to prevent a certain day (e.g. uploading a lot of pictures while the user is traveling) to skew the data to a different location.

In further examples, processing operations are described for rendering and managing one or more mappings identifying users and assigned data centers across the world. Processing operations may be applied to automatically migrate user data to an assigned data center based on the primary geographic region of the user, for example, using an exemplary mapping. Processing operations can be configured to select users for data migration where user data can be migrated to data centers across the world (e.g. U.S. data center, European data center, Asian data center, etc.) based on the primary geographic region associated with a user. In examples, processing can be automated so that user data can be continuously re-located to an appropriate data center when the primary geographic region of the user changes. In examples where a primary geographic region of a user is un-confirmed (e.g. threshold evaluation is unsatisfied), exemplary systems and/or methods may be configured to confirm a primary geographic region of a user.

Among other examples, processing operations described herein are useful for classification of users into an appropriate geography so that users can be identified for data center migration. Looking at small set of data points to determine the geography of a user is insufficient because the user could be traveling on any given day. As a result, processing operations evaluate a larger range of historical data to generate a more accurate determination as to the most likely geography for that user. As newer data centers are created, similar processing operations can be applied to select user candidates for data migration. In some examples, multiple data centers may be associated with a geographic region. In such examples, processing operations executed may further select a particular data center of a geographic region to store user data based on evaluation of the log data for a user and/or results of analyzing the log data for the user.

Examples described herein can also be used to determine how to allocate resources of an application/service. For example, a determination can be made to allocate/re-allocate more or less resources (hardware or virtual) based on determined number of users associated with a data center of a geographic region. Furthermore, resources can be re-allocated based on subsequent expansions of data centers across the world.

Additionally, examples described herein related to evaluation of user log data can be applied to help determine whether a user account is being abused. For instance, evaluation of an exemplary particular geographic region or a primary geographic region associated with a user may be utilized in a determination as to whether a user account is being inappropriately accessed or abused. In one example, a user account may be hacked or inappropriately accessed from another geographic location. Evaluation of log data of a user can help identify such instances.

Furthermore, examples described herein related to evaluation of user log data can be applied to assist with identification of application content (e.g. data streams, news, images, artists, terms of user, consent agreements, click-wrap consents, etc.) that can be provided to the user. For example, geo-classification data identified from log evaluation of user data can be used to identify content provided through the application/service that is particular to user interests and/or a geographic region of the user.

Accordingly, the present disclosure provides a plurality of technical advantages including but not limited to: improved evaluation of application log data, improve accuracy for geo-classifying users, ability to implement processing operations to efficiently and effectively comply with privacy and data security laws and regulations, ability to automate processing for identifying user data and migrating user data to a data center, more efficient operation of processing devices (e.g., saving computing cycles/computing resources) during application/service execution including the ability to re-allocate resources of an application/service, ability to enhance detection of abuse of user data, improving user interaction with an application/service including improved network performance for accessing user data of an application and extensibility to integrate processing operations described herein in a variety of different applications/services, among other examples.

Figure 2A:
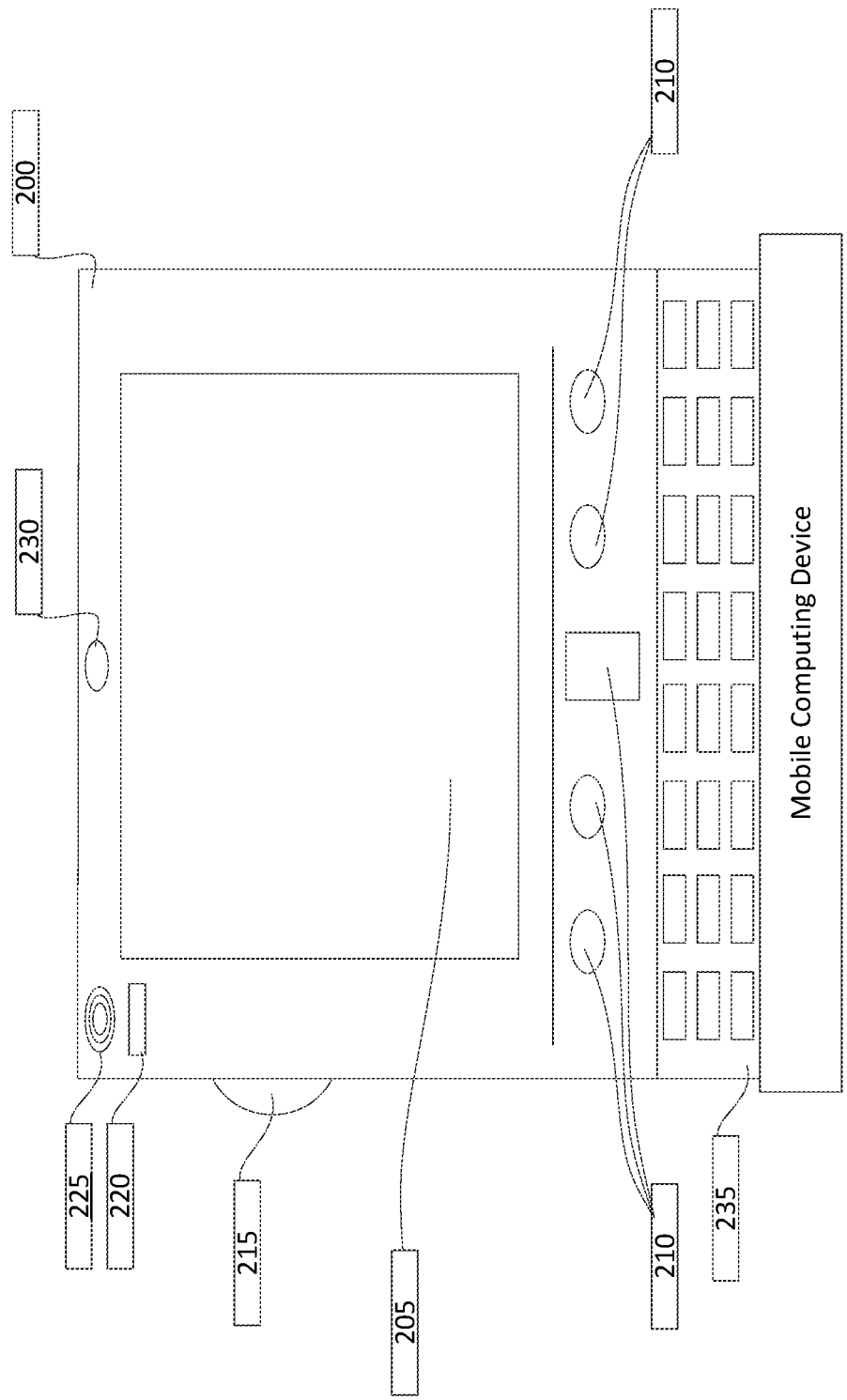
FIGS. 2A and 2B are simplified block diagrams of a mobile computing device with which aspects of the present disclosure may be practiced.
Figure 2B:
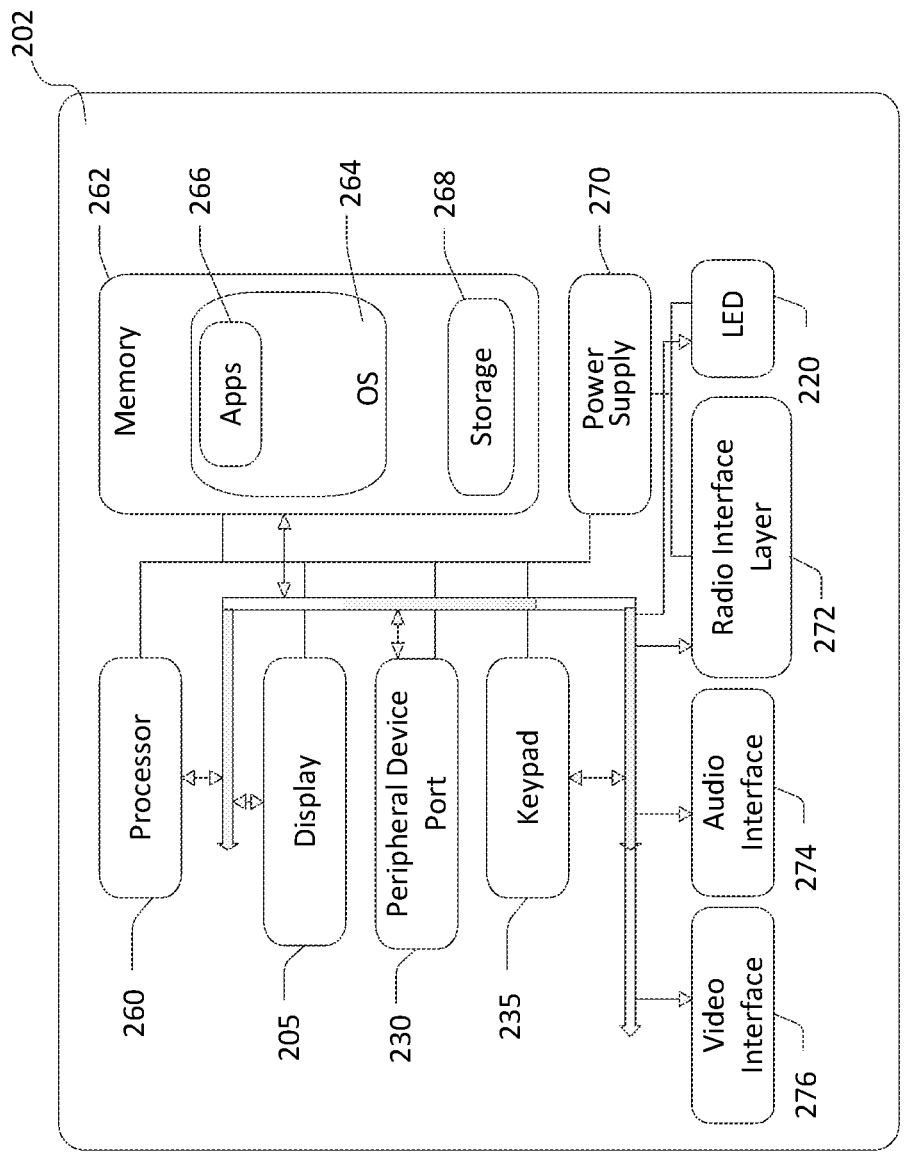
Figure 3:
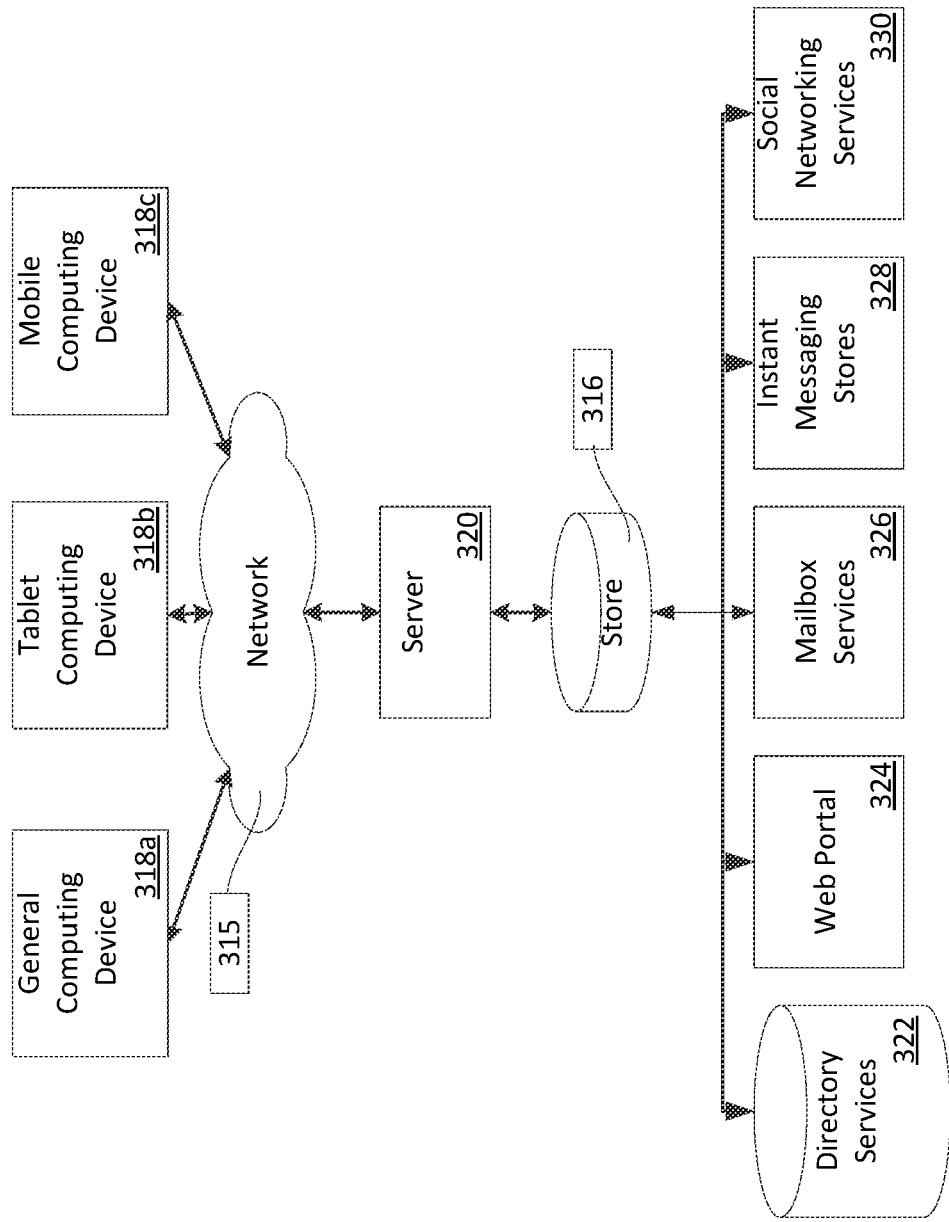
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. Among other examples, computing device 102 may be an exemplary computing device configured for log data evaluation and subsequent processing based on results of the log data evaluation. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 102 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device configured for log data evaluation and subsequent processing based on results of the log data evaluation. Application command control may be provided for applications executing on a computing device such as mobile computing device 200. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device (e.g. system 202) described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225 (as described in the description of mobile computing device 200). In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225 (shown in FIG. 2A), the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. The system of FIG. 3 may be an exemplary system configured for log data evaluation and subsequent processing based on results of the log data evaluation. Target data accessed, interacted with, or edited in association with programming modules 108 and/or applications 120 and storage/memory (described in FIG. 1) may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and a client node may be implemented for connecting to network 315. Examples of a client node comprise but are not limited to: a computing device 102 embodied in a personal computer, a tablet computing device, and/or by a mobile computing device 200 (e.g., mobile processing device). As an example, a client node may connect to the network 315 using a wireless network connection (e.g. WiFi connection, Bluetooth, etc.). However, examples described herein may also extend to connecting to network 315 via a hardwire connection. Any of these examples of the client computing device 102 or 200 may obtain content from the store 316.

Figure 4:
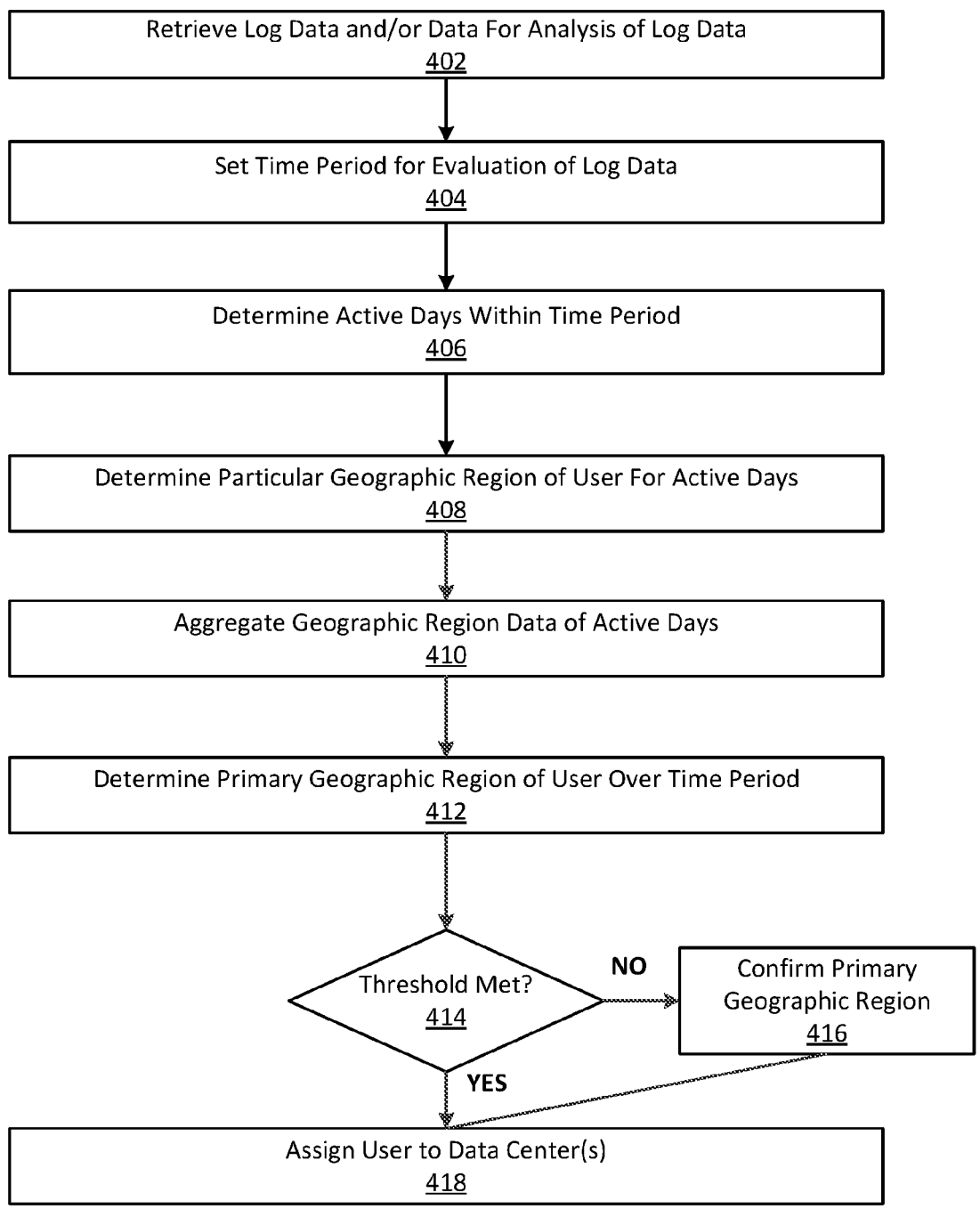
FIG. 4 is an exemplary method related to evaluation of log data of an application/service with which aspects of the present disclosure may be practiced.

FIG. 4 is an exemplary method 400 related to evaluation of log data of an application/service with which aspects of the present disclosure may be practiced. As an example, method 400 may be executed by an exemplary processing device and/or system such as those shown in FIGS. 1-3. In examples, method 400 may execute on a device comprising at least one processor configured to store and execute operations, programs or instructions. Operations performed in method 400 may correspond to operations executed by a system and/or service that execute computer programs, application programming interfaces (APIs), neural networks or machine-learning processing, among other examples. As an example, processing operations executed in method 400 may be performed by one or more hardware components. In another example, processing operations executed in method 400 may be performed by one or more software components. In some examples, processing operations described in method 400 may be executed by one or more applications/services associated with a web service that has access to a plurality of application/services, devices, knowledge resources, etc. Processing operations described in method 400 may be implemented by one or more components connected over a distributed network, for example, as described in system 600 (of FIG. 6).

Method 400 begins at processing operation 402, where log data and/or data for analysis of log data is retrieved. Retrieval (processing operation 402) may be executed by one or more processing devices that perform processing operations for evaluation of log data for users of one or more applications/services. Among other examples, an exemplary application/service may be a storage service that stores user data at one or more data centers across the world. User data is any data or content provided by a user, where the user data is uploaded and stored in a storage associated with an exemplary data center associated with an application/service. In one example, exemplary user data (associated with an application/service) may be accessed remotely over a distributed network.

Exemplary log data may be application logs from an exemplary application/service. Log data may be identified that corresponds to a particular user. In some examples, log data may include any call operations made by an application/service or any call operations made by a user to an application/service. In some instances, an action by a user may comprise multiple call operations. In one example, log data may be filtered to identify log data that is end user specific, where log data that is retrieved (processing operation 402) may comprise only log data for call operations made by a user. In such an example the log data is filtered to include user traffic and calls where file owner is making the call. For instance, call operations may comprise application programming interface (API) calls made to a service by an end user (e.g. when a user logs in, when a user accesses a file or any type of activity on a website associated with a service). In alternative examples, log data may not be filtered, where log data comprises a history of all operations in order to maintain integrity of application logs as well as present a mix of traffic types.

Processing operation 402 may further comprise retrieval of data for analysis of exemplary log data. One or more processing devices that execute evaluation operations for log data may execute a collection of processing operations (e.g. in a program or script) to geo-classify a user based on historical log data for the user. In one example, users may be geo-classified based on internet protocol (IP) address data associated with a user. However, examples described herein may evaluate any data collected by application logs. Data collected by application logs is known to one skilled in the art.

In order to best evaluate application log data, additional information may be retrieved from other resources (e.g. platform resources), for example, to evaluate IP address data from application users. In one example, a mapping for geographic information to user data is retrieved that comprises data aggregated from a plurality of other resources of a platform including but not limited to: user account management services, search services, social networking services, personal intelligent assistant services, knowledge databases, geographical information services, etc. An exemplary mapping for geographic information may comprise different ranges of IP addresses for geographic regions as well as user data (e.g. unique identification (ID) for a user) and/or geographical region data (e.g. city, country, latitude, longitude, country code, confidence level accuracy for location, etc.). In some examples, a mapping for geographic information may include more data than is needed to evaluate specific instances of application log data. Operation 402 may comprise parsing and filtering operations to select information used to geo-classify users from application log data. In one example, processing operations may comprise filtering (e.g. removing some data or collapsing a view of a mapping to view only needed data fields) a mapping. In some examples, portions of data can be filtered or extracted from a mapping. For instance, in a case where internet protocol (IP) address data is being evaluated, portions of the IP address data or associated configuration information can be filtered to remove portions of the data that may not be needed. In some examples, operations may be executed to parse and select portions of data from the mappings for comparison with exemplary log data.

The mapping for geographic information may be used to identify an exemplary particular geographic region and/or an exemplary primary geographic region of a user, as described herein. In some examples, additional documentation may be accessed to assist with evaluation of application log data. For instance, an exemplary mapping of geographic information may identify countries associated with IP address ranges using abbreviated country codes. Another resource may be utilized to map abbreviated country codes to full names for countries. Other resources may also be utilized to map countries to data centers in specific geographic regions.

Flow may proceed to processing operation 404, where a time period is set for evaluation of log data for the application. In some examples, a given time period for evaluating log data may be set before log data is retrieved (processing operation 402). This may assist with efficiency in retrieving log data. In other examples, processing devices for evaluating log data may have access to all log data for a specific application. In such an instance, a given time period for evaluating log data may be set (processing operation 404) at any time. A given time period may be set to evaluate users over a longer period of time as opposed to evaluating a single day of user activity. This can improve accuracy in determining a true geographic location of a user as well as minimize the possibility that an outlier from a particular day of activity skewing results. As an example, an exemplary time period may be set to evaluate six (6) months of log data associated with a user of an application. However, one skilled in the art understanding the present disclosure should recognize that a length of a given time period for evaluating log data may vary.

Flow may proceed to processing operation 406, where the log data may be evaluated and active days are determined for the time period set in processing operation 404. As an example, processing operation 406 may comprise identifying one or more active days where the user interacted with an application/service for the given time period. An active day comprises one or more call operations made to the application by the user. In examples, evaluation of log data may proceed when one or more active days are identified for a given time period. In some instances, a small number of active days are identified within a given time period. In such a case, an alternative example of processing operations described herein may alter a time period for evaluating log data to enlarge a sample data set for evaluating a user.

At processing operation 408, log data associated with a user is further evaluated to determine a particular geographic region for the one or more active days identified in a given time period. As identified above, a particular geographic region pertains to a geographic region where the user is located on a particular day (e.g. active day of the given time period). In one example, processing operation 408 may identify one or more countries associated with IP address data identified in evaluation of log data from an active day of a given time period. A country may be mapped to a geographic region, for example, using exemplary mapping data retrieved in processing operation 402.

In evaluating an active day of log data for a user of an application/service, one or more internet protocol (IP) addresses may be identified that are associated with a largest amount of call volume for call operations of a particular active day of user log data. In examples, any of the processing operations related to evaluation of log data may comprise parsing and filtering out portions of log data that are needed for evaluation. For instance, log data can be parsed where internet protocol (IP) address data is extracted from user log data. In further examples, extraction of portions of data may comprise extracting parts of data (e.g. part of an IP address data or associated configuration information).

In determining a particular geographic region of a user, consider an example where there were 10 call operations log for a particular active day. In that example, 8 call operations to an application/service may have occurred from an IP address located in Europe (e.g. Barcelona (Spain)) and 2 call operations to the application/service may have been logged from New York (U.S.A.), where a user may have been in Barcelona and then took a flight to New York and logged into the application/service. Processing operations may be executed that identify that a majority of the call operation volume occurred from Barcelona (Spain), where IP address data from those call operations may be further evaluated and utilized to map those IP addresses to a particular geographic region. In doing so, a threshold analysis may be applied to determine a largest amount of call volume based on the number of call operations made to an application/service on a given day. Rules for a threshold evaluation of call volume may be set by developers and may vary. In such an example, a country associated with the one or more IP addresses may be identified, for example, using a mapping that comprises IP address ranges for associated countries (e.g. mapping data retrieved in processing operation 402). The identified country may be mapped to a particular geographic region, for example, where a data center (or multiple data centers) may exist.

Flow may proceed to processing operation 410, where geographic region data for active days is aggregated over the given time period. Geographic region data may correspond to a particular geographic region for each of the active days. Operation 410 may comprise one or more processing operations that aggregate the particular geographic regions for each of the active days of the given time period. A primary geographic region of the user may be determined for the user based on analysis of the one or more active days of the log data. A primary geographic region is a location in the world that a user has spent the most time in for the given time period. A primary geographic region may be associated with one or more data centers across the world. As a means for comparison, a particular geographic region for a user is determined for each active day where the primary geographic region of a user is determined from an analysis of the aggregated particular geographic locations over the given time period.

Flow may proceed to processing operation 412, where the aggregated geographic region data is evaluated to determine a primary geographic region of the user over the given time period. In one example, the primary region is determined based on a threshold analysis of the aggregated geographic region data. Threshold values may be set for determining a primary geographic region of the user. In one example, the determining (processing operation 412) of the primary geographic region further comprises comparing, for the aggregated geographic region data, a threshold value for the given time period with a number of active days that a user is in the particular geographic region. In one instance, a threshold may be set that comprises a minimum number of active days that a user is in a geographic region for a confirmation that the primary geographic region of the user is actually a particular geographic region. In another example, a threshold value is associated with a percentage determined from active days the user is in a particular geographic region over the total active days for a given time period. However, one skilled in the art that understands the present disclosure should recognize that threshold values may be manipulated by developers. A data center may be assigned for storage of user data based on the primary geographic region.

Flow may proceed to decision operation 414, where it is determined whether an exemplary threshold value is satisfied for confirming a primary geographic region for the user. As identified above, an exemplary threshold value may be associated with a number of active days that the user is in the particular geographic region for the given time period. For instance, a threshold may be met when the number of active days for the particular geographic region (over a given time period) meets or exceeds the threshold value. Alternatively, the threshold value may be a percentage of active days of the user in particular region over a total number of active days of a given time period.

In examples, additional signal data associated with log data may be evaluated to improve accuracy in determining a particular geographic region of a user and/or a primary geographic region of a user. Examples of additional signal data include but are not limited to: timestamp data, location data, confidence level indications for location based on analysis from other platform resources, device information, user account information, social networking data, etc. Such data may also be factored into a threshold determination for confirming geo-classification information for a user.

If an exemplary threshold value is not met, flow branches NO and proceeds to processing operation 416. In some examples where a threshold value is not satisfied, a primary geographic of the user may be assigned as "unknown". In some examples of processing operation 416, correspondence may occur with a user to confirm a primary geographic region of the user. In some example, a message may be generated for the user to confirm within an application/service or through an alternative means of communication (e.g. text message, email, etc.) associated with a user account of the user. Once a primary geographic region of a user is confirmed, flow may proceed to processing operation 418 described below. If a threshold value is satisfied, flow branches YES and proceeds to processing operation 418

An exemplary program or script for determining a primary geographic region of a user may include but is not limited to the following processing operations:

```
For each user:
TotalDaysWithActivity=0
TotalDaysWithApacActivity=0
TotalDaysWithEmeaActivity=0
TotalDaysWithNamActivity=0
TotalDaysWithLatamActivity=0
For each day in the 6 months of application log data:
If user has any API calls that day:
    TotalDaysWithActivity+=1
If user has >X % API calls from APAC that day:
    TotalDaysWithApacActivity+=1
If user has >X % API calls from EMEA that day:
    TotalDaysWithEmeaActivity+=1
If user has >X % API calls from NAM that day:
    TotalDaysWithNamActivity+=1
If user has >X % API calls from LATAM that day:
    TotalDaysWithLatamActivity+=1
User is in APAC (first geographic region)
If               TotalDaysWithApacActivity/
    TotalDaysWithActivity>Y %:
User is in EMEA (second geographic region)
If               TotalDaysWithEmeaActivity/
    TotalDaysWithActivity>Y %:
User is in NAM (third geographic region)
If               TotalDaysWithNamActivity/
    TotalDaysWithActivity>Y %:
User is in LATAM (fourth geographic region)
If               TotalDaysWithLatamActivity/
    TotalDaysWithActivity>Y %:
Else:
User is in Unknown Geo.
```

At processing operation, 418, a user may be assigned to a data center for storage of user data associated with the user. Assigning of a user to a data center may occur on a per user basis or a mapping of users to particular data centers may be generated. In an example where a mapping of users/data centers is maintained, processing operation 418 comprises adding the user to a mapping of users to be migrated to a particular data center. Mappings of users to data centers may be useful for easily identifying where user data is being stored. Such mappings are also useful as data center presence is expanded to different geographic regions across the world. In some cases, multiple data centers may be associated with a geographic region. In such cases, processing operation 418 may comprise selecting, from multiple data centers of a geographic region, a data center to assign user data. As an example, particular geographic regions of the user may be analyzed and used to determine a particular data center to assign a user. However, one skilled in the art understanding the present disclosure should recognize that any portion of user log data and/or results from analysis of user log data can be used to assign a user to a particular data center.

In alternative examples of method 400, evaluation of log data described herein may be tailored to determine how to allocate resources of an application/service. For example, a determination can be made to allocate/re-allocate more or less resources (hardware or virtual) based on determined number of users associated with a data center of a geographic region. Furthermore, resources can be re-allocated based on subsequent expansions of data centers across the world.

Furthermore, alternative examples of method 400 can be applied to assist with identification of application content (e.g. data streams, news, images, artists, terms of user, consent agreements, click-wrap consents, etc.) that can be provided to the user. For example, geo-classification data identified from log evaluation of user data can be used to identify content provided through the application/service that is particular to user interests and/or a geographic region of the user.

Figure 5:
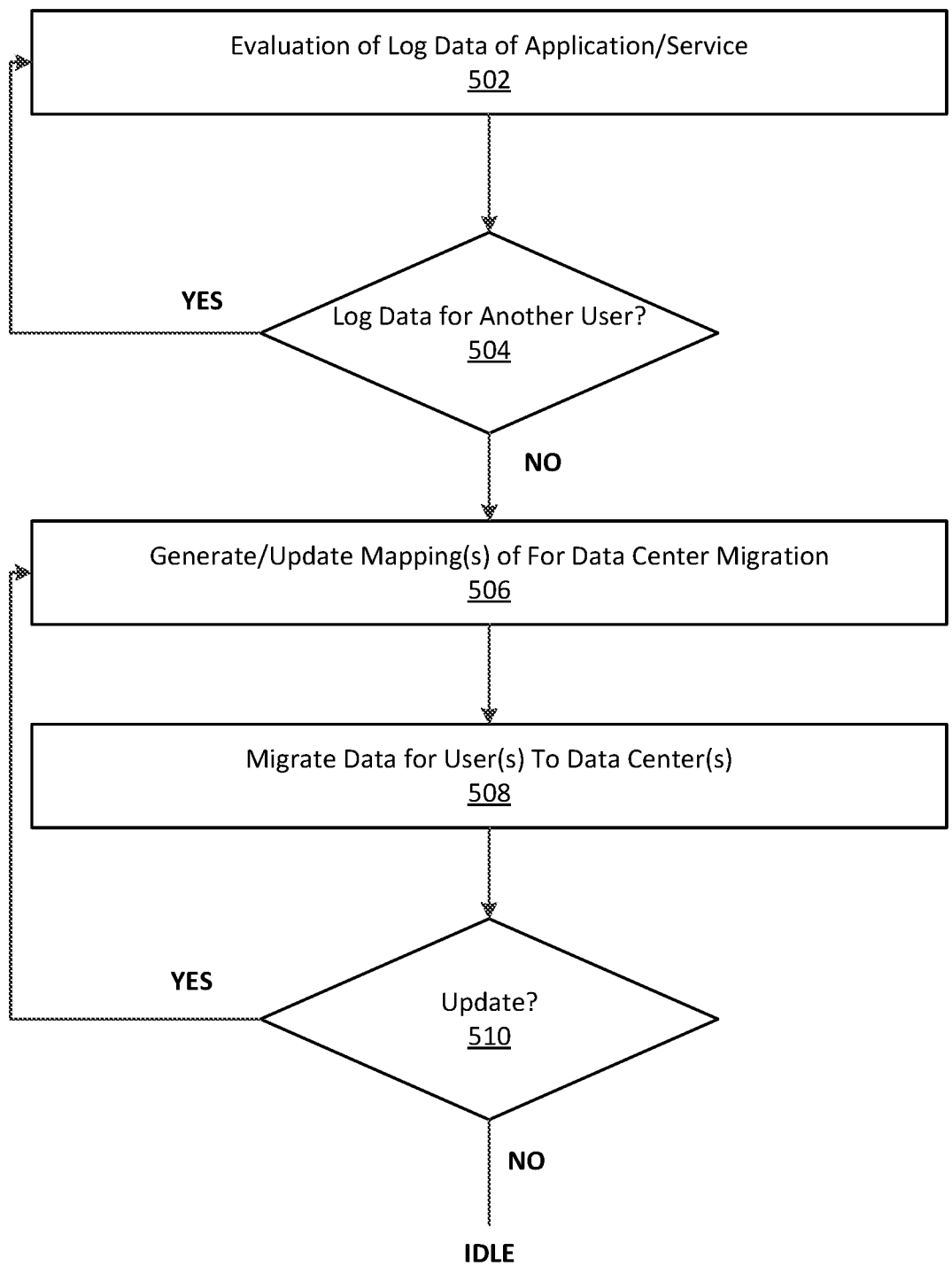
FIG. 5 is an exemplary method related to migration of user data with which aspects of the present disclosure may be practiced.

FIG. 5 is an exemplary method 500 related to migration of user data with which aspects of the present disclosure may be practiced. As an example, method 500 may be executed by an exemplary processing device and/or system such as those shown in FIGS. 1-3. In examples, method 500 may execute on a device comprising at least one processor configured to store and execute operations, programs or instructions. Operations performed in method 500 may correspond to operations executed by a system and/or service that execute computer programs, application programming interfaces (APIs), neural networks or machine-learning processing, among other examples. As an example, processing operations executed in method 500 may be performed by one or more hardware components. In another example, processing operations executed in method 500 may be performed by one or more software components. In some examples, processing operations described in method 500 may be executed by one or more applications/services associated with a web service that has access to a plurality of application/services, devices, knowledge resources, etc. Processing operations described in method 500 may be implemented by one or more components connected over a distributed network, for example, as described in system 600 (of FIG. 6).

Method 500 begins at processing operation 502, where log data of an application/service is evaluated. Examples related to evaluation of log data for a user are described in the foregoing description of method 400. Evaluation of log data for one or more users may be an automated process.

Flow may proceed to decision operation 504, where it is determined whether additional user data is to be evaluated. If log data for another user is to be evaluated, flow branches YES and returns to processing operation 502, where log data for a next user is evaluated. If log data is not to be further evaluated at a given point in time, flow branches NO and proceeds to processing operation 506.

At processing operation 506, one or more mappings for migration of user data to particular data centers is either generated or updated (when a mapping already exists). Users are mapped to geographies and then associated with a data center of a given geography. Mappings may be maintained for particular data centers of a geography and/or for a particular geographic region (that comprises one or more data centers). An exemplary mapping may be generated (or updated) based on evaluation of log data for particular users of an application/service. A mapping may comprise a listing of one or more users that are assigned to have their user data stored at a particular data center (e.g. in a particular geographic region). Mappings may also be generated for scheduled migration of user data based on plans to expand data centers across the world. In examples, users may be assigned to data centers based on an exemplary primary geographic region as described in the foregoing. Mappings may be generated for individual data centers or a master mapping may be generated that comprises assignment of users across all data centers. Exemplary mappings may be managed in real-time or periodically published based on scheduled evaluation of assignment of users to data centers across the world.

In alternate examples, a mapping may be generated that identifies that particular user data that is stored across various data centers. For instance, a user may have a large amount of user data, where some of the user data may be classifiable as relating to a particular geographic region and other user data may be classifiable as relating to another particular geographic region. In such an instance, processing operations may be applied to apportion user data between different data centers. In an alternative example where multiple data centers are associated with a particular geographic region, user data may be assigned to data centers within the particular geographic region. In such an example, a service can provide verification to a user confirming that the user data is being managed within a particular geographic region.

At processing operation 508, user data may be migrated to an assigned data center (or alternatively multiple data centers). Processing operation 508 may migrate user data to a data center that is assigned based on a primary geographic region of the user. In some examples, processing operation 508 may utilize an exemplary mapping for assignment of user center to a data center in order to manage migration of user data amongst data centers. In one example, an exemplary migration may comprise moving user data from a data center in a first geographic region to another data center in a second geographic region. In another example, user data may be migrated between data centers of a geographic region. However, migration of user data is not limited to such examples.

Flow may proceed to decision operation 510, where it is determined if there is an update to an exemplary mapping for assignment of user data to a data center. For instance, a new user may be assigned to a particular data center or a user assignment may be changed based on re-evaluation of log data for the user at a subsequent point in time. In examples, a process for re-assigning users to a data center may be automated based on periodic evaluation of log data of an application.

In some examples, re-evaluation of log data for a user may comprise using log data from different time periods to confirm a geographic region of the user, for example, in a case where a new given time period doesn't have enough active days for full confidence to make a determination (e.g. may boost confidence using analysis of a previous given time period associated with user log data). As an example, a user may be identified as being in Europe (and assigned to a European Data center) based on analysis of a first given time period of log data. That user may not log in as frequently to an application/service during a second given time period. In such a case, a threshold of active days within a particular geographic region (e.g. Europe) may not be satisfied. However, analysis of a second given time period can indicate (with reasonable probability) that the user is still in Europe when also contemplating data of a first time period. Alternatively, a time period for evaluating log data can be expanded.

If an update to an exemplary mapping for assignment of user data occurs, flow branches YES and returns back to processing operation 506, where an exemplary mapping may be updated. In cases where an update to an exemplary mapping occurs, flow may also proceed to update data centers with respect to the storage of user data (e.g. add user data to a new data center or re-migrate user data between data centers) as described in processing operation 508. If no update to an exemplary mapping occurs, flow branches NO and processing of method 500 remains idle until further log data is to be evaluated or an updated to an exemplary mapping occurs.

Figure 6:
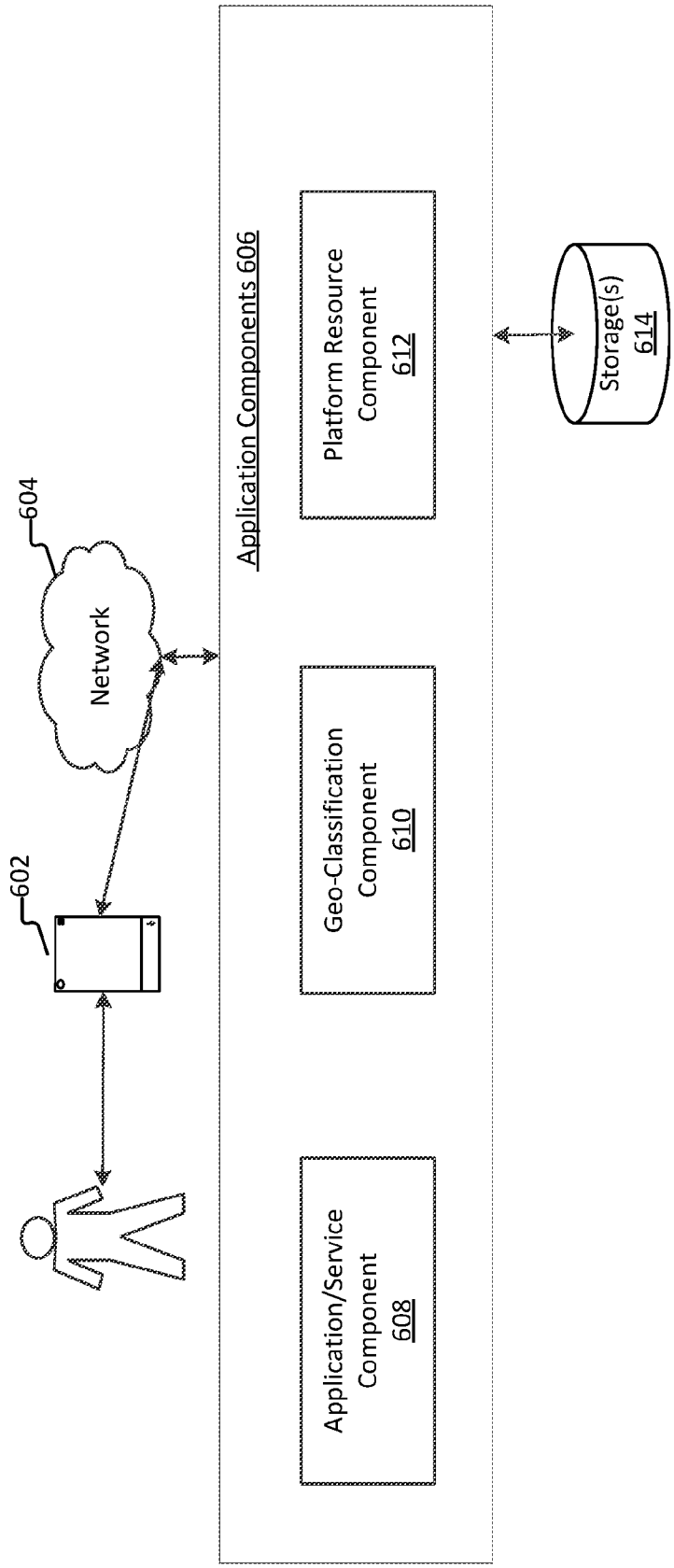
FIG. 6 illustrates an exemplary system implementable on one or more computing devices on which aspects of the present disclosure may be practiced.

FIG. 6 illustrates an exemplary system 600 implementable on one or more computing devices on which aspects of the present disclosure may be practiced. System 600 may be an exemplary system for log data evaluation and subsequent processing based on results of the log data evaluation. Components of system 600 may be hardware components or software implemented on and/or executed by hardware components. In examples, system 600 may include any of hardware components (e.g., ASIC, other devices used to execute/run an OS, and software components (e.g., applications, application programming interfaces, modules, virtual machines, runtime libraries) running on hardware. In one example, an exemplary system 600 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be executed on a processing device such as a computer, mobile device (e.g., smartphone/phone, tablet) and/or any other type of electronic devices. As an example of a processing device operating environment, refer to operating environments of FIGS. 1-3. One or more components of system 600 may be configured to execute any of the processing operations described in at least method 400 described in the description of FIG. 4 and method 500 described in the description of FIG. 5. In other examples, the components of systems disclosed herein may be spread across multiple devices. Exemplary system 600 comprises application components 606 that further comprise: an application/service component 608, a geo-classification component 610 and a platform resource component 612, where each of the identified components may comprise one or more additional components.

One or more data stores/storages or other memory may be associated with system 600. For example, a component of system 600 may have one or more data storage(s) 614 (described below) associated therewith. Data associated with a component of system 600 may be stored thereon as well as processing operations/instructions executed by a component of system 600. Furthermore, it is presented that application components of system 600 may interface with other application services. Application services may be any resource that may extend functionality of one or more components of system 600. Application services may include but are not limited to: personal intelligent assistant services, productivity applications, web search services, e-mail applications, calendars, device management services, address book services, informational services, line-of-business (LOB) management services, customer relationship management (CRM) services, debugging services, accounting services, payroll services and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 600.

System 600 may comprise one or more storage(s) 614 that may store data associated with operation of one or more components of system 600. In examples, storage(s) 614 may interface with other components of system 600. Data associated with any component of system 600 may be stored in storage(s) 614, where components may be connected to storage(s) 614 over a distributed network including cloud computing platforms and infrastructure services. Exemplary storage(s) 614 may be any of a first-party source, a secondparty source, and a third-party source. Storage(s) 614 are any physical or virtual memory space. Storage(s) 614 may store any data for processing operations performed by components of system 600, retained data from processing operations, stored programs, code or application programming interfaces (APIs), training data, links to resources internal and external to system 600 and knowledge data among other examples. Furthermore, in examples, components of system 600 may utilize knowledge data in processing by components of system 600. Knowledge may be used by one or more components of system 600 to improve processing of any of the application components 606 where knowledge data can be obtained from resources internal or external to system 600. In examples, knowledge data may be maintained in storage(s) 614 or retrieved from one or more resources external to system 600 by knowledge fetch operation. In examples (as described below) storage(s) 614 may store exemplary data programs/services and other types of data for: application/service data including log data and user information, storage for user data of an exemplary application/service, processing operations for evaluation of log data, resources utilized during the evaluation of log data including mappings used for geo-classification, mappings for data center migration and platform resources including processing operations for interfacing with other applications/services of an associated platform, among other examples.

In FIG. 6, processing device 602 may be any device comprising at least one processor and at least one memory/storage. Examples of processing device 602 may include but are not limited to: processing devices such as desktop computers, servers, phones, tablets, phablets, slates, laptops, watches, and any other collection of electrical components such as devices having one or more processors or circuits. In one example processing device 602 may be a device of a user that is executing applications/services. In examples, processing device 602 may communicate with the application components 606 via a network 604. In one aspect, network 404 is a distributed computing network, such as the Internet. Application services may communicate with application components 606 via the network 604. Processing device 602 may be a device as described in the description of FIGS. 1-3. In some examples, processing device 602 may comprise multiple connected devices. Processing device 602 is an example of a user computing device.

The processing device 602 may execute processing operations that include an ability to access an application/service through a user account. In one example, processing device 602 may connect an authenticated user to an exemplary application/service that stores user data for one or more users of the application/service. An exemplary storage application/service may provide a user of processing device 602 with access to data stored in an exemplary data center. In one example, processing device 602 may be connected with storage(s) 614 via a distributed network, which may provide users with access to user data. One or more tenant resources (e.g. Tenant Resource A, Tenant Resource B, Tenant Resource C, etc.) may be associated with processing device 602. A tenant resource may be a user account associated with a processing device and/or distributed network service. Data associated with a tenant resource may be stored on storage(s) 614, where a tenant account can be utilized to access stored data by processing device 602 and/or other processing devices.

The application components 606 are a collection of components that interface to enable log data evaluation and subsequent processing based on results of the log data evaluation. As identified above, application components 606 may comprise: an application/service component 608, a geo-classification component 610 and a platform resource component 612.

The application/service component 608 is a component that is configured to execute processing operations associated with an exemplary application/service. An example of an exemplary application/service is a storage application that stores user data for users (e.g. over a distributed network). The application/service component 608 is configured to maintain exemplary log data for users of the application/service. In doing so, the application/service component 608 may interface with other application components 606 such as the geo-classification component 610 to provide log data of users for evaluation, among other examples. The application/service component 608 may further interface with the platform resource component 612 to extend functionality associated with an exemplary application/service. User data is associated with an exemplary application/service, where the application/service component 608 may further interface with storage(s) 614 for storing exemplary user data. In another example, the application/service component 608 may interface with storage(s) 614 for the migration of user data between storages associated with different data centers, for example, based on instructions provided by the geo-classification component 610.

The geo-classification component 610 is configured to execute processing operations previously described in method 400 (FIG. 4) and method 500 (FIG. 5). As an example, the geo-classification component 610 may interface with other applications components 606 to enable geo-classification of users associated with log data as well as providing results from evaluation of log data, for example, to platform applications/services. The geo-classification component 610 may also be configured to manage data centers associated with exemplary applications/services. In one example, the geo-classification component 610 is configured to execute migration of user data associated with one or more applications/services. In alternative examples, the geo-classification component 610 is configured to instruct the application/service component 608 for executing migration of data between exemplary data centers.

The platform resource component 612 is configured to provide extensibility of platform resources (e.g. application services described above) to improve processing of the application/service component 608 and the geo-classification component 610. In one example, the platform resource component 612 may be configured to interface with the geo-classification component 610 to provide exemplary mapping data to enable the geo-classification component 610 to determine geographic locations of a user as well as exemplary particular geographic regions and exemplary primary geographic regions described herein. The platform resource component 612 may further provide knowledge data (described above) to assist the other components with processing operations executed therein.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   evaluating, over a given time period, log data for a user of an application, wherein the evaluating comprises:
   determining one or more active days for the user within the given time period, wherein an active day comprises one or more call operations made to the application by the user,
   determining, for the given time period, a primary geographic region of the user based on an analysis of the one or more active days of the log data; and
   assigning, based on the primary geographic region, one or more data centers for storage of user data that is associated with the user.

2. The method of claim 1, wherein the determining of the primary geographic region further comprises:
   determining, for the one or more active days, a particular geographic region of the user based on a threshold determination associated with call volume of call operations identified in the log data,
   aggregating, over the given time period, geographic region data that corresponds to the particular geographic region for the one or more active days, and
   determining, for the given time period, the primary geographic region based on a threshold analysis of the aggregated geographic region data.

3. The method of claim 2, wherein the determining of the primary geographic region further comprises comparing, for the aggregated geographic region data, a threshold value for the given time period with a number of active days that a user is in the particular geographic region, and wherein the assigning assigns the one or more data centers for data storage of the user data when the number of active days for the particular geographic region meets or exceeds the threshold value.

4. The method of claim 2, further comprising confirming the primary geographic region associated with the user based on a determination that a threshold value is unsatisfied, wherein the threshold value is associated with a number of active days that the user is in the particular geographic region for the given time period.

5. The method of claim 2, wherein the determining of the particular geographic region further comprises: identifying, for the one or more active days of the given time period, an internet protocol (IP) address associated with a largest amount of call volume for call operations of a particular day; identifying a country associated with the IP address using a mapping that comprises IP address ranges for associated countries; and mapping, for active days of the given time period, the identified country to the particular geographic region.

6. The method of claim 1, further comprising migrating the user data to the assigned one or more data centers.

7. The method of claim 6, wherein the user data is migrated from another data center located in one selected from a group consisting of: the primary geographic region and a different geographic region.

8. The method of claim 1, further comprising generating a mapping of one or more users associated with the assigned one or more data centers.

9. The method of claim 8, further comprising updating the mapping based on the assigning of the one or more data centers for storage of the user data.

10. A system comprising:
    at least one processor; and
    a memory operatively connected with the at least one processor storing computer-executable instructions that, when executed by the at least one processor, causes the at least one processor to execute a method that comprises:
    evaluating, over a given time period, log data for a user of an application, wherein the evaluating comprises:
    determining one or more active days for the user within the given time period, wherein an active day comprises one or more call operations made to the application by the user,
    determining, for the given time period, a primary geographic region of the user based on an analysis of the one or more active days of the log data; and
    assigning, based on the primary geographic region, one or more data centers for storage of user data that is associated with the user.

11. The system of claim 10, wherein the determining of the primary geographic region further comprises:
    determining, for the one or more active days, a particular geographic region of the user based on a threshold determination associated with call volume of call operations identified in the log data,
    aggregating, over the given time period, geographic region data that corresponds to the particular geographic region for the one or more active days, and
    determining, for the given time period, the primary geographic region based on a threshold analysis of the aggregated geographic region data.

12. The system of claim 11, wherein the determining of the primary geographic region further comprises comparing, for the aggregated geographic region data, a threshold value for the given time period with a number of active days that a user is in the particular geographic region, and wherein the assigning assigns the one or more data centers for data storage of the user data when the number of active days for the particular geographic region meets or exceeds the threshold value.

13. The system of claim 11, wherein the executed method further comprises: confirming the primary geographic region associated with the user based on a determination that a threshold value is unsatisfied, wherein the threshold value is associated with a number of active days that the user is in the particular geographic region for the given time period.

14. The system of claim 11, wherein the determining of the particular geographic region further comprises: identifying, for the one or more active days of the given time period, an internet protocol (IP) address associated with a largest amount of call volume for call operations of a particular day; identifying a country associated with the IP address using a mapping that comprises IP address ranges for associated countries; and mapping, for active days of the given time period, the identified country to the particular geographic region.

15. The system of claim 10, wherein the executed method further comprises: migrating the user data to the assigned one or more data centers.

16. The system of claim 15, wherein the user data is migrated from another data center located in one selected from a group consisting of: the primary geographic region and a different geographic region.

17. The system of claim 10, wherein the executed method further comprises: generating a mapping of one or more users associated with the assigned one or more data centers.

18. The system of claim 17, wherein the executed method further comprises: updating the mapping based on the assigning of the one or more data centers for storage of the user data.

19. A non-transitory computer-readable medium storing computer-executable instructions that, when executed by at least one processor, causes the at least one processor to execute a method comprising:

evaluating, over a given time period, log data for a user of an application, wherein the evaluating comprises:

determining one or more active days for the user within the given time period, wherein an active day comprises one or more call operations made to the application by the user, determining, for the given time period, a primary geographic region of the user based on an analysis of the one or more active days of the log data; and assigning, based on the primary geographic region, one or more data centers for storage of user data that is associated with the user.

20. The non-transitory computer-readable medium of claim 19, wherein the determining of the primary location further comprises:

identifying, for the one or more active days of the given time period, an internet protocol (IP) address associated with a largest amount of call volume for call operations of a particular day;

identifying a country associated with the IP address using a mapping that comprises IP address ranges for associated countries;

mapping, for active days of the given time period, the identified country to a particular geographic region;

aggregating, over the given time period, geographic region data that corresponds to a particular geographic region for the one or more active days, and determining, for the given time period, the primary geographic region based on a threshold analysis of the aggregated geographic region data.

\* \* \* \* \*